(12) United States Patent
Ohta et al.

(10) Patent No.: US 10,543,563 B2
(45) Date of Patent: Jan. 28, 2020

(54) CONDUCTIVE WIRE WELDING METHOD, STATOR, AND HIGH-FREQUENCY INDUCTION HEATING DEVICE

(71) Applicant: HONDA MOTOR CO., LTD., Tokyo (JP)

(72) Inventors: Minoru Ohta, Wako (JP); Toru Koseki, Wako (JP); Takashi Hasegawa, Wako (JP); Yoshihide Ochi, Higashikurume (JP)

(73) Assignee: HONDA MOTOR CO., LTD, Tokyo (JP)

( * ) Notice: Subject to any disclaimer, the term of this patent is extended or adjusted under 35 U.S.C. 154(b) by 450 days.

(21) Appl. No.: 15/310,861

(22) PCT Filed: May 15, 2015

(86) PCT No.: PCT/JP2015/063969
§ 371 (c)(1),
(2) Date: Nov. 14, 2016

(87) PCT Pub. No.: WO2015/174509
PCT Pub. Date: Nov. 19, 2015

(65) Prior Publication Data
US 2017/0080516 A1   Mar. 23, 2017

(30) Foreign Application Priority Data

May 16, 2014 (JP) .................................. 2014-102255

(51) Int. Cl.
*B23K 13/01* (2006.01)
*H05B 6/10* (2006.01)
(Continued)

(52) U.S. Cl.
CPC ............... *B23K 13/01* (2013.01); *H02K 3/12* (2013.01); *H02K 3/28* (2013.01); *H05B 6/10* (2013.01);
(Continued)

(58) Field of Classification Search
CPC .... B23K 13/00; B23K 13/01; B23K 2101/32; B23K 2101/36; B23K 2101/38;
(Continued)

(56) References Cited

U.S. PATENT DOCUMENTS

| 3,842,234 A | * | 10/1974 | Seyfried | ................ | H05B 6/102 |
| | | | | | 219/673 |
| 6,288,376 B1 | * | 9/2001 | Tsumura | ................ | B23K 1/002 |
| | | | | | 219/673 |
| 2014/0225465 A1 | | 8/2014 | Goto | | |

FOREIGN PATENT DOCUMENTS

| CN | 202137484 U | 2/2012 |
| JP | 57-40892 | 3/1982 |

(Continued)

OTHER PUBLICATIONS

Office Action dated May 2, 2017, issued in counterpart Japanese Patent Application No. 2016-519307, with English translation. (9 pages).

(Continued)

*Primary Examiner* — Hung D Nguyen
(74) *Attorney, Agent, or Firm* — Westerman, Hattori, Daniels & Adrian, LLP

(57) ABSTRACT

A conductive wire welded structure of which a stator is composed can be obtained using a conductive wire welding method in which a plurality of conductive wires are welded together using a high-frequency induction heating device. This conductive wire welding method involves performing a disposition step in which a plurality of conductive wires (Continued)

are made to intersect and the end of at least one of the conductive wires is disposed at a location that is extended from an intersection portion, and a welding step in which the end of the at least one conductive wire that is at a location extended from the intersection portion is welded outside an induction heating coil by induction heating, and the welded material thereof is solidified at the intersection portion.

6 Claims, 12 Drawing Sheets

(51) Int. Cl.
*H05B 6/36* (2006.01)
*H02K 3/12* (2006.01)
*H02K 3/28* (2006.01)
*B23K 101/32* (2006.01)
*B23K 101/36* (2006.01)

(52) U.S. Cl.
CPC ............ *H05B 6/36* (2013.01); *B23K 2101/32* (2018.08); *B23K 2101/36* (2018.08)

(58) Field of Classification Search
CPC ........... B23K 2101/42; H02K 15/0061; H02K 15/0081; H02K 15/04; H02K 15/0414; H02K 3/12; H02K 3/28; H05B 6/10; H05B 6/102; H05B 6/104; H05B 6/14; H05B 6/30; H05B 6/36; H05B 6/362; H05B 6/365; H05B 6/42; H05B 6/44
USPC ....... 219/605, 617, 635, 638, 639, 643, 645, 219/646, 673, 675, 677

See application file for complete search history.

(56) References Cited

FOREIGN PATENT DOCUMENTS

| | | |
|---|---|---|
| JP | 58-154592 U | 10/1983 |
| JP | 59-211985 | 11/1984 |
| JP | 2013-55732 A | 3/2013 |
| WO | 2013/099001 A1 | 7/2013 |

OTHER PUBLICATIONS

International Search Report dated Aug. 18, 2015, issued in counterpart International Application PCT/JP2015/063969 (2 pages).
Office Action dated Apr. 16, 2018, issued in counterpart Chinese application No. 201580024300.6, with English translation. (11 pages).

* cited by examiner

CONDUCTIVE WIRE WELDING METHOD, STATOR, AND HIGH-FREQUENCY INDUCTION HEATING DEVICE

TECHNICAL FIELD

The present invention relates to a conductive wire welding method, a stator, and a high-frequency induction heating device for welding together a plurality of conductive wires.

BACKGROUND ART

For example, a stator for a rotary electric machine is equipped with an annular stator core, and in the stator core, a plurality of slots that extend in radial directions and in which a stator coil is mounted are formed at a predetermined interval separation in the circumferential direction.

In such a stator, a technical concept has been proposed in which segment coils which are formed substantially in a U-shape are installed in plurality so as to straddle across a predetermined two of the slots, and the corresponding segment coils, which extend outward in an axial direction of the stator core, are welded to each other by TIG welding to thereby form the stator coil (for example, refer to Japanese Laid-Open Patent Publication No. 2013-055732).

SUMMARY OF INVENTION

Incidentally, with the aforementioned stator, because the plural segment coils (conductive wires) are arranged in close proximity, cases occur in which a sufficient space cannot be assured for the purpose of TIG welding the corresponding segment coils to each other. If this takes place, since the TIG welding electrodes cannot be arranged in a suitable space, it is likely for cases to occur in which it is impossible to reliably weld the segment coils together.

Further, in the event there are a plurality of welding locations of the segment coils, since there is a need for TIG welding to be performed separately, the number of welding steps increases. Furthermore, with TIG welding, when the electrodes become oxidized, polishing or replacement of the electrodes is necessary, and therefore, this leads to an increase in the number of welding steps or an increase in manufacturing equipment costs.

The present invention has been devised taking into consideration the aforementioned problems, and has the object of providing a conductive wire welding method, a stator, and a high-frequency induction heating device, which are capable of welding together a plurality of conductive wires reliably and efficiently.

A conductive wire welding method according to the present invention is characterized by a method for welding a plurality of conductive wires, comprising an arranging step of causing the plurality of conductive wires to intersect, together with disposing an end of at least one of the conductive wires at a position extended from an intersection site, and a welding step of melting by induction heating the end of the at least one conductive wire that is at the position extended from the intersection site on an outer side of an induction heating coil, and causing a molten material to become solidified at the intersection site.

In accordance with such a method, the end of the at least one conductive wire is melded by induction heating at an outer side of the induction heating coil, and the molten material thereof forms a welded part by becoming solidified at the intersection site. Therefore, even in the case that a sufficient space cannot be provided for TIG welding the intersection site, the plurality of conductive wires can be welded together reliably and efficiently. Moreover, in the event that the intersection site itself is melted, the molten material tends to drip and fall vertically downward, and thus there is a concern that the joint strength may become insufficient. However, since the end of at least one of the conductive wires is melted at the position extended from the intersection site, and the molten material thereof becomes solidified at the intersection site, a sufficient joint strength can be obtained.

In the aforementioned conductive wire welding method, in the arranging step, the end of the at least one conductive wire may be positioned in close proximity to the intersection site. In accordance with such a method, the molten material can easily be guided to the intersection site.

In the aforementioned conductive wire welding method, in the arranging step, the intersection site may be disposed vertically below the induction heating coil, and in the welding step, the molten material may be solidified at the intersection site while being subjected to action of a magnetic levitation force on the molten material that is oriented vertically upward.

In accordance with such a method, because the molten material is subjected to the action of the magnetic levitation force, dripping and falling down of the molten material from the intersection site can be suppressed. Stated otherwise, the molten material can be solidified while being held at the intersection site. Consequently, the plural conductive wires can be welded together more reliably.

In the above-described conductive wire welding method, in the arranging step, a plurality of the intersection sites may be arranged side by side, and in the welding step, while an end of at least one of the conductive wires is at a position extended from each of the intersection sites, the ends may be melted simultaneously by induction heating, and the molten material may become solidified at the intersection sites.

In accordance with such a method, since welding can be performed simultaneously at the plurality of intersection sites, compared to the case of welding the intersection sites separately, the welding operation can be performed more efficiently.

A stator according to the present invention is characterized by having a conductive wire welded structure in which plural stator coils are welded on an outer side in an axial direction of a stator core, wherein the conductive wire welded structure includes an intersection site where a plurality of conductive wires intersect, and is formed by melting by way of induction heating an end of at least one of the conductive wires that is at a position extended from the intersection site, and by solidification of a molten material at the intersection site.

In the above-described stator, the conductive wire welded structure may be formed by melting by way of induction heating the end of the at least one conductive wire that is at the position extended from the intersection site on an outer side of an induction heating coil, and by solidification of the molten material at the intersection site. In accordance with the stator of the present invention, the same advantages and effects as those of the aforementioned conductive wire welding method are realized.

A high-frequency induction heating device according to the present invention is equipped with an induction heating coil through which a high-frequency current flows, wherein the induction heating coil contains on a same plane a pair of opposing members, which are disposed while being separated mutually apart from each other, and a connecting member that connects the pair of opposing members, and further, the pair of opposing members are constructed so that a mutual separation distance therebetween becomes smaller from one side toward another side thereof in a height direction of the induction heating coil.

In accordance with such a structure, by flowing of the high-frequency current through the pair of opposing members, lines of magnetic force can be generated on the other side in the height direction of the induction heating coil. Therefore, for example, in the event that the plural conductive wires are made to intersect and are welded, the end (heated portion) of the conductive wire on the outer side of the induction heating coil (the other side of the induction heating part) can be melted by way of induction heating, and the molten material thereof can be solidified at the intersection site. Thus, even in the case that a sufficient space cannot be provided for TIC welding the intersection site, by using the high-frequency induction heating device, the plural conductive wires can be welded together reliably and efficiently.

In the above-described high-frequency induction heating device, a core member, which is constituted to include a magnetic material, may be arranged between the pair of opposing members. In accordance with such a structure, through the core member, the lines of magnetic force can be concentrated at the other side of the induction heating coil. Consequently, it is possible to efficiently carry out heating of the heated portion.

In the above-described high-frequency induction heating device, magnetic bodies may be disposed on outer surfaces of the respective opposing members. In accordance with such a structure, through the magnetic bodies, the lines of magnetic force can be concentrated at the other side of the induction heating coil. Consequently, it is possible to efficiently carry out heating of the heated portion.

In the above-described high-frequency induction heating device, the induction heating coil is formed substantially in a U-shape as viewed in plan. In accordance with such a structure, with a simple configuration, a plurality of heated portions can be subjected to induction heating simultaneously.

According to the present invention, an end of at least one conductive wire at a position extended from an intersection site is welded by induction heating at an outer side of the induction heating coil, and the molten material thereof becomes solidified at the intersection site. Therefore, the plurality of conductive wires can be welded together reliably and efficiently.

DESCRIPTION OF EMBODIMENTS

Preferred embodiments in relation to a conductive wire welding method, a stator, and a high-frequency induction heating device according to the present invention will be presented and described below with reference to the accompanying drawings.

Figure 1:
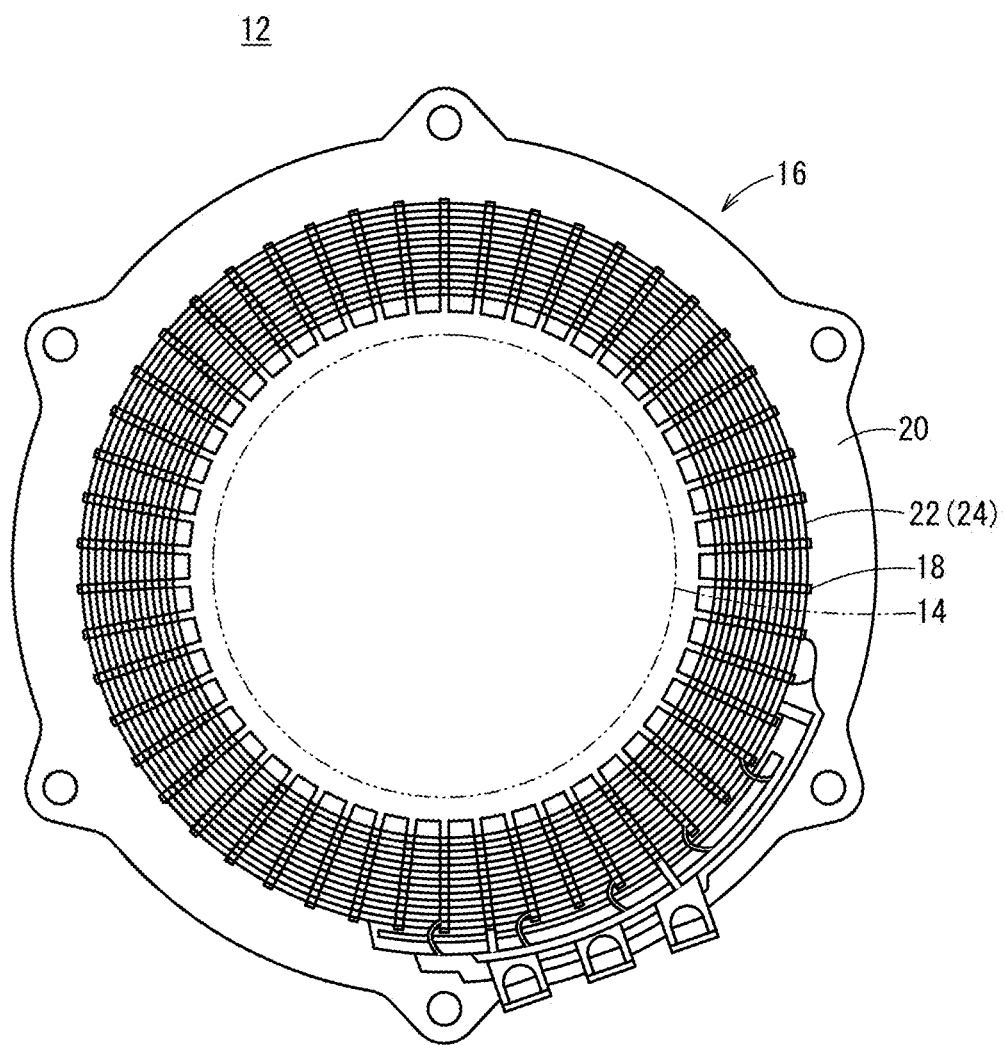
FIG. 1 is a plan view of a rotary electric machine according to an embodiment of the present invention.

At first, a rotary electric machine 12, which is equipped with a conductive wire welded structure 10 according to an embodiment of the present invention, will be described. As shown in FIG. 1, the rotary electric machine 12 comprises a rotor 14 and a stator 16, and is used, for example, as an electric motor or a generator. The stator 16 includes an annular stator core 20 in which a plurality of slots 18 are formed, and three phase (U-phase, V-phase, W-phase) stator coils 22 that are mounted in the slots 18.

The respective slots 18 penetrate through the stator core 20 in the axial direction, together with extending in radial directions and opening on an inner circumferential surface of the stator core 20. The slots 18 are arranged at predetermined intervals in the circumferential direction of the stator core 20.

Figure 2A:
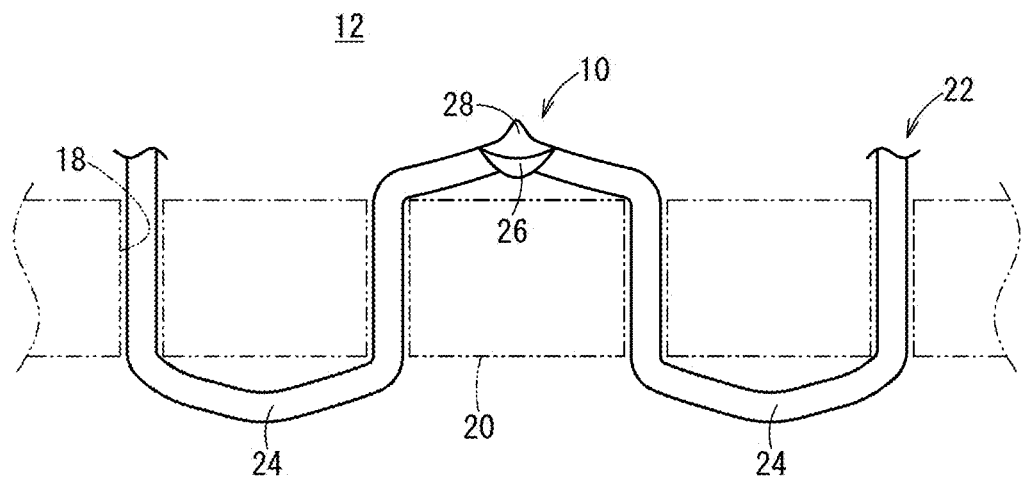
FIG. 2A is a schematic illustration for describing a conductive wire welded structure for the rotary electric machine of FIG. 1.

As shown in FIG. 2A, the stator coils 22 are mounted in such a manner that conductive wires (segment coils) 24 thereof, which are formed substantially in a U-shape, straddle across a predetermined two of the slots 18, and the stator coils 22 are constituted such that portions thereof, which are exposed from the slots 18 on an outer side in the axial direction of the stator core 20, are bent in the circumferential direction, and the corresponding conductive wires 24 are welded and connected together in series. It should be noted that multiple conductive wires 24 are arranged in each one of the slots 18 along the diametrical direction of the stator core 20.

The respective conductive wires 24 are flat wires formed with a rectangular shape in cross section, and for example, a metal material such as copper or the like can be used therefor preferably. However, the cross-sectional shape of the respective conductive wires 24 may be of any arbitrary shape such as a square shape, a circular shape, an elliptical shape, etc.

Figure 2B:
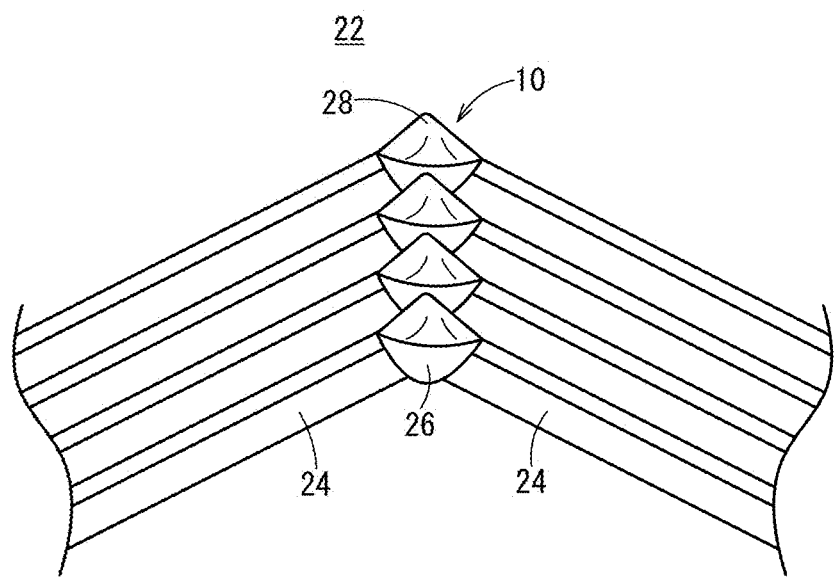
FIG. 2B is a perspective view of the conductive wire welded structure.
Figure 3:
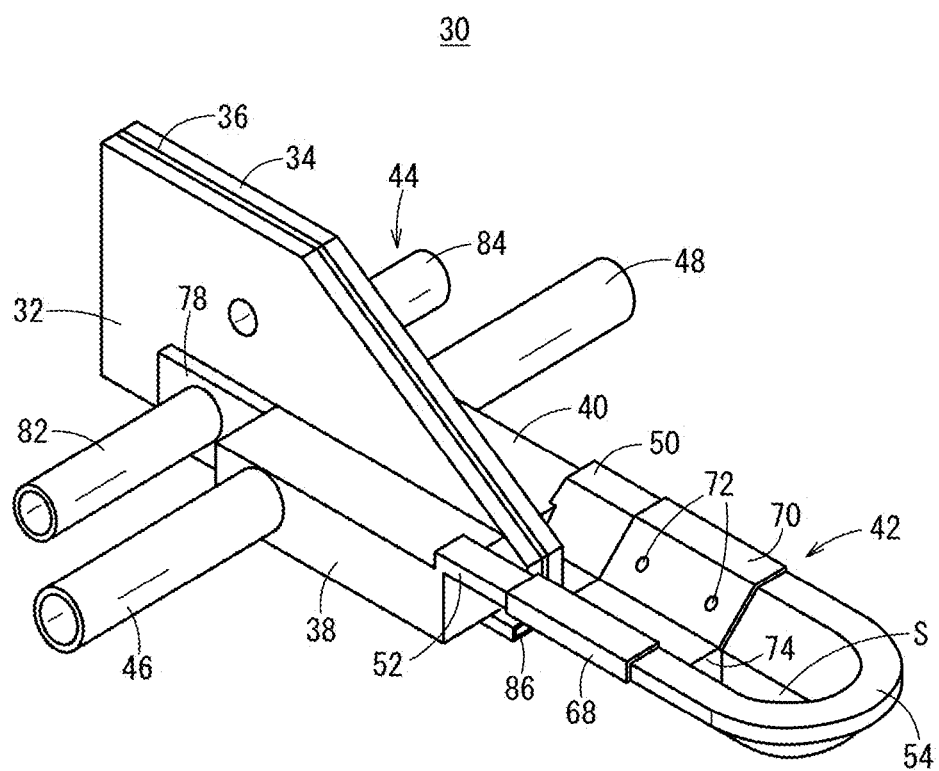
FIG. 3 is a perspective view of a high-frequency induction heating device according to an embodiment of the present invention.
Figure 4:
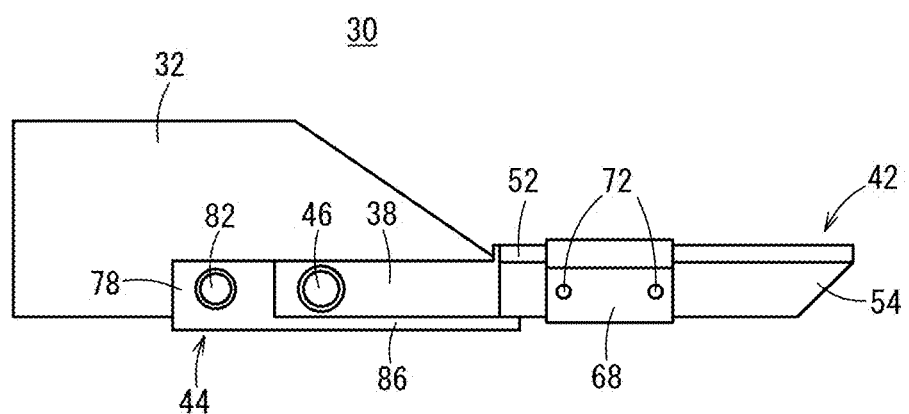
FIG. 4 is a side view of the high-frequency induction heating device of FIG. 3.
Figure 5:
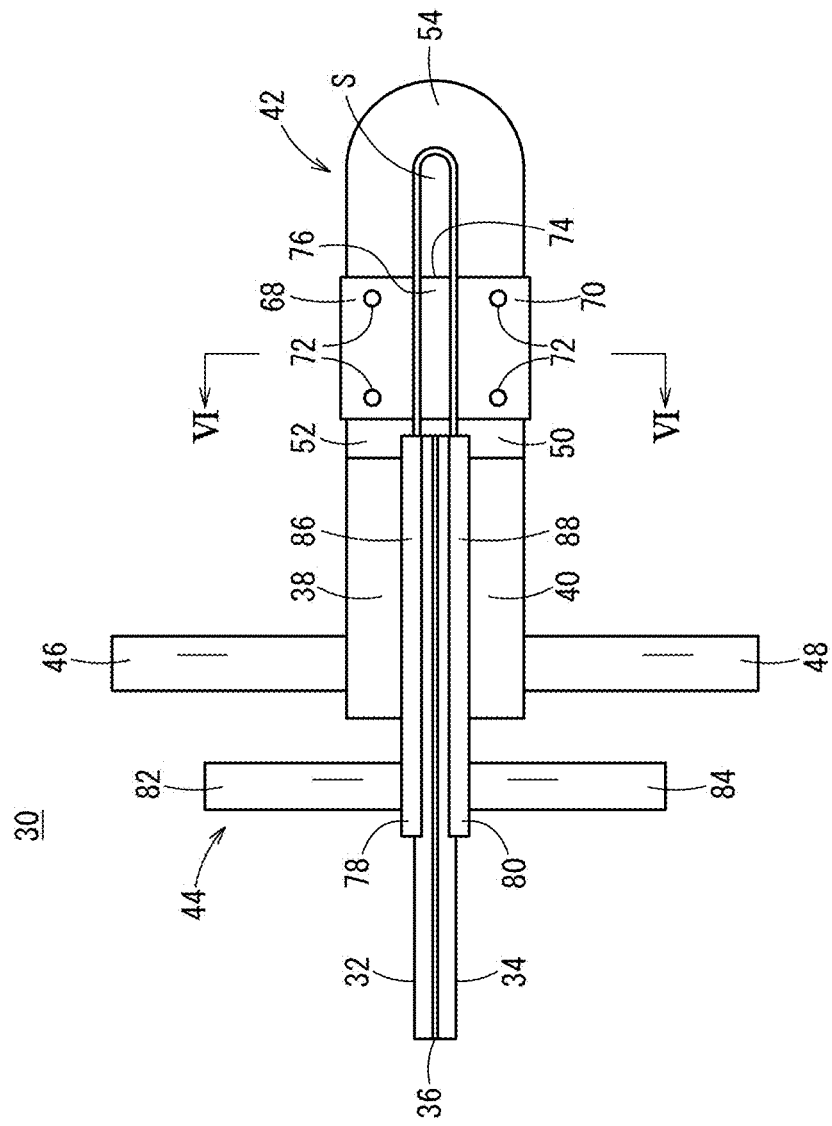
FIG. 5 is a rear view of the high-frequency induction heating device of FIG. 3.

The stator coils 22, which are constituted in the foregoing manner, are equipped with plural conductive wire welded structures 10 in which two of the conductive wires 24 are welded (see FIG. 2B). The conductive wire welded structures 10, for example, are arranged in a row mutually adjacent to each other in the radial and circumferential directions of the stator core 20.

According to the present embodiment, the conductive wire welded structure 10 includes an intersection site 26 where two of the conductive wires 24 intersect, and a welded part 28, which is formed by melting by way of induction heating ends of each of the conductive wires 24 that reside at positions extended from the intersection site 26 on an outer side of a later-described induction heating coil 42, and by solidification of the molten material at the intersection site 26.

The rotary electric machine 12 according to the present embodiment is constructed basically as described above. Next, a description will be made concerning a high-frequency induction heating device 30 that is used in a conductive wire welding method.

As shown in FIGS. 3 through 6, the high-frequency induction heating device 30 is equipped with a pair of terminal plates 32, 34 connected electrically to a non-illustrated high-frequency power source, and insulating plate 36 interposed between the terminal plates 32, 34, the induction heating coil 42 that is disposed via connecting parts 38, 40 on each of the terminal plates 32, 34, and a gas supplying unit 44. The pair of terminal plates 32, 34, the pair of connecting parts 38, 40, and the induction heating coil 42 can be made using, for example, a metal material such as copper or the like, preferably.

The respective connecting parts 38, 40 are constituted, for example, by hollow block-shaped bodies A tubular coolant introduction portion 46, through which a coolant is introduced to the interior thereof, is connected to the connecting part 38 that is fixed to the outer surface of the terminal plate 32. A tubular coolant outlet portion 48, through which the coolant in the interior thereof is led out, is connected to the connecting part 40 that is fixed to the outer surface of the terminal plate 34. For the coolant, for example, although cooling water can suitably be used, any arbitrary gas or liquid may also be used.

The induction heating coil 42 is formed substantially in a U-shape as viewed in plan, and an internal space S is formed by both ends thereof being disposed at the connecting parts 38, 40. More specifically, in the induction heating coil 42, a pair of opposing members 50, 52, which are provided with a separation distance mutually therebetween, and a connecting member 54, which interconnects the opposing members 50, 52 and is bent in a circular arc shape, are contained on the same plane.

In the description to be given below, in relation to the induction heating coil 42 and its constituent elements, outer sides in the widthwise direction of the induction heating coil 42 (directions separating away from the pair of opposing members 50, 52) will be referred to as "outer sides", inner sides in the widthwise direction of the induction heating coil 42 (sides where the pair of opposing members 50, 52 are in close proximity) will be referred to as "inner sides", the upper direction in FIG. 6 will be referred to as "one" direction, and the lower direction in FIG. 6 will be referred to as an "other" direction.

Figure 6:
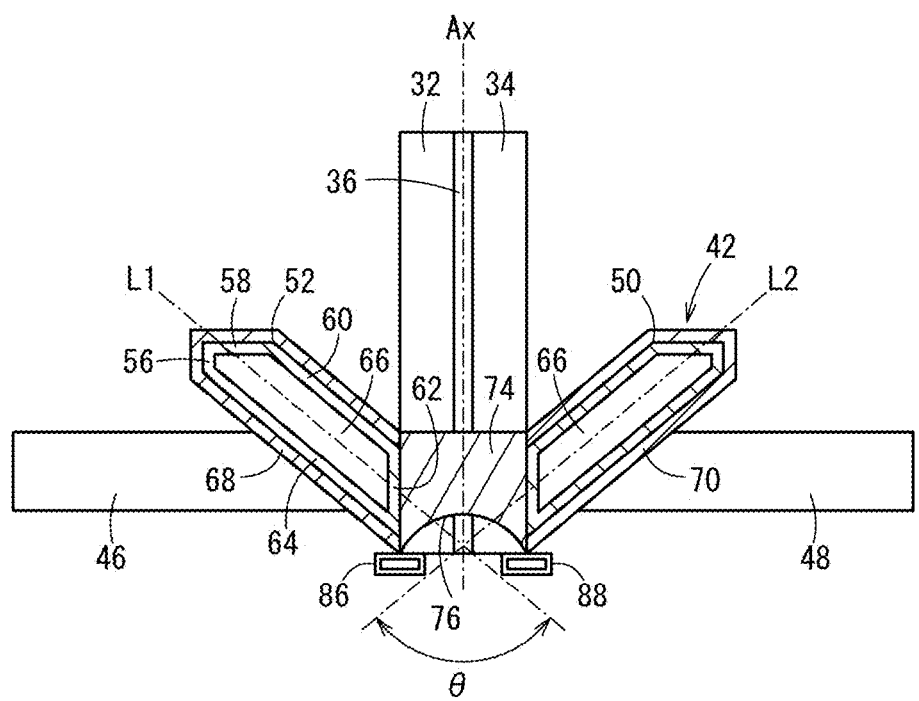
FIG. 6 is a cross-sectional view taken along line VI-VI of FIG. 5.

As shown in FIG. 6, the induction heating coil 42 includes an outer wall 56, a horizontal wall 58, a first inclined wall 60, an inner wall 62, and a second inclined wall 64. The outer wall 56 makes up a region on the outermost side of the induction heating coil 42. The horizontal wall 58 extends substantially horizontally toward the inside from an end of the outer wall 56. The first inclined wall 60 extends in an inclined manner inwardly from an inner side end of the horizontal wall 58 toward the other side. The inner wall 62 extends toward the other side along a height direction (the vertical direction in FIG. 6) from an end of the first inclined wall 60, and constitutes a region on the innermost side of the induction heating coil 42. The second inclined wall 64 extends to another end part of the inner wall 62 in an inclined manner inwardly from another end of the outer wall 56 toward the other side.

In the induction heating coil 42 which is constructed in the foregoing manner, a coolant passage 66 through which the coolant flows is formed by the outer wall 56, the horizontal wall 58, the first inclined wall 60, the inner wall 62, and the second inclined wall 64. The coolant passage 66 communicates with an inner hole of the connecting part 38 and with an inner hole of the connecting part 40. In accordance with this feature, the coolant, which is introduced to the inner hole of the connecting part 38 from the coolant introduction portion 46, flows through the coolant passage 66 of the induction heating coil 42 to the inner hole of the connecting part 40, and is guided to the coolant outlet portion 48. Moreover, the coolant that is guided to the coolant outlet portion 48 passes through a predetermined circulation passage, and after heat exchange is carried out, the coolant flows again into the coolant introduction portion 46.

The pair of opposing members 50, 52 are constructed with bilateral symmetry. Therefore, the pair of opposing members 50, 52 are constructed so that a mutual separation distance between portions of the first inclined wall 60 thereof becomes smaller from one side toward the other side thereof in the height direction of the induction heating coil 42. Stated otherwise, the pair of opposing members 50, 52 are inclined outwardly on the one side toward the other side with respect to an axis of symmetry Ax (a line in the height direction that passes through the center between the opposing members 50, 52). More specifically, in the respective opposing members 50, 52, line segments L1, L2 that pass through the centers thereof between the first inclined wall 60 and the second inclined wall 64 intersect the axis of symmetry Ax. The angle (bank angle θ) formed by these line segments L1, L2 can be set arbitrarily.

Further, magnetic bodies 68, 70 are provided on outer surfaces of the induction heating coil 42. The magnetic bodies 68, 70 are not particularly limited and, for example, silicon steel plates may suitably be used therefor. Within a partial range in the longitudinal direction of the respective opposing members 50, 52, the magnetic bodies 68, 70 are disposed so as to enclose the outer wall 56, the horizontal wall 58, the first inclined wall 60, and the second inclined wall 64. However, the range over which the magnetic bodies 68, 70 are disposed may be set suitably corresponding to the size of the heated portion, and for example, the magnetic bodies 68, 70 can be provided in a U-shape over the entire length of the induction heating coil 42.

The magnetic bodies 68, 70 are joined by brazing with respect to the induction heating coil 42. In this case, preferably, one or a plurality of holes 72 are formed in advance in the magnetic bodies 68, 70. If such holes 72 are formed, flowing of the brazing material at the time of brazing can be confirmed, and therefore, it can easily be known whether or not the magnetic bodies 68, 70 have been joined in intimate contact reliably with respect to the induction heating coil 42. Assuming that the magnetic bodies 68, 70 have been joined in intimate contact reliably with respect to the induction heating coil 42, even if the magnetic bodies 68, 70 become heated when the induction heating coil 42 is energized, the magnetic bodies 68, 70 can efficiently be cooled by the coolant passage 66.

A core member 74 that includes a magnetic material is interposed between portions of the inner wall 62 that makes up the pair of opposing members 50, 52. The core member 74 can be obtained, for example, by powder-compacting a magnetic composite material made of a metal powder such as iron powder or the like that is coated with an insulative coating, or by forming the core member 74 by kneading the core powder. The core member 74 is formed in a block-like shape, which extends at the same length as the length of the magnetic bodies 68, 70. In the other end surface of the core member 74, a groove 76 is formed, which is arcuately shaped in cross section over the total length thereof (see FIG. 6).

By forming the groove 76 in this manner, since the distance between the core member 74 and the heated member that is disposed on the other side of the core member 74 can be enlarged, it is possible for radiant heat, which is received by the core member 74 from the heated member, to be suppressed. A heat-resistant coating may be applied to at least the other end surface of the core member 74. In this case, the radiant heat received by the core member 74 can be further suppressed.

The gas supplying unit 44 includes support blocks 78, 80 that are fixed to outer surfaces of each of the terminal plates 32, 34, tubular gas introduction portions 82, 84 that supply gas to inner holes of the support blocks 78, 80, and gas nozzles 86, 88 that are extended from the support blocks 78, 80 on the side of the induction heating coil 42.

Concerning the gas, air preferably is used, for example. However, the gas is not limited to air, and for example, an inert gas such as nitrogen, helium, argon, etc., may be used. In this case, even if the gas flows onto the heated portion, the occurrence of oxidization (welding burns) on the heated portion can be suppressed.

The respective gas nozzles 86, 88, for example, are constituted in the form of rectangular tubes, with distal ends thereof being arranged on the other side of the inner wall 62 of the opposing members 50, 52. In addition, in this state, the openings of the gas nozzles 86, 88 are directed toward the side of the connecting member 54. In accordance therewith, the gas that is led to the gas nozzles 86, 88 from the gas introduction portions 82, 84 and through the inner holes of the support blocks 78, 80 flows between the opposing members 50, 52 and the heated portion. The respective gas nozzles 86, 88 may be formed in a shape other than a rectangular tubular shape, such as, for example, a cylindrical shape or the like.

In greater detail, a gas curtain (air curtain) is formed between the opposing members 50, 52 and the heated portion. Thus, it is possible to suppress the radiant heat that the induction heating coil 42 receives from the heated portion. Moreover, a heat-resistant coating may be applied at least to a surface of the induction heating coil 42 that is oriented toward the other side where the heated portion is positioned. In this case, the radiant heat received by the induction heating coil 42 can be further suppressed. Moreover, a heat-resistant coating may be applied not only to the induction heating coil 42, but also across the entire lower surface including the core member 74.

Next, a description will be made concerning the conductive wire welding method in which the above-described high-frequency induction heating device 30 is used.

Figure 7:
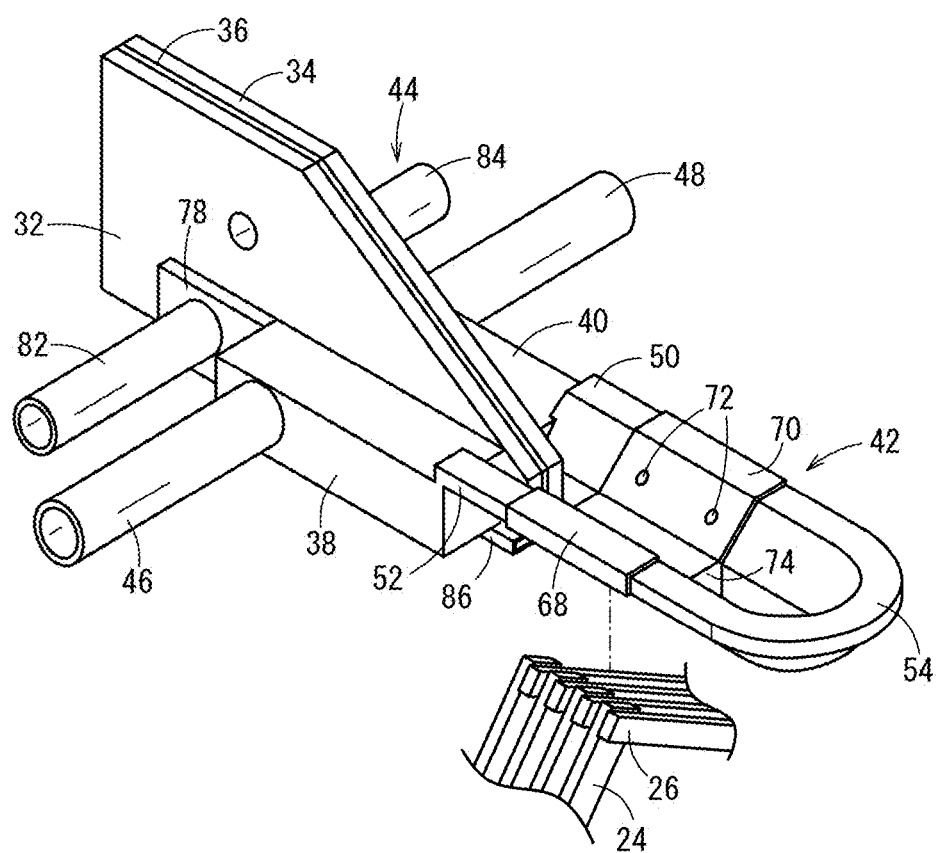
FIG. 7 is a perspective view for describing an arranging step.
Figure 9A:
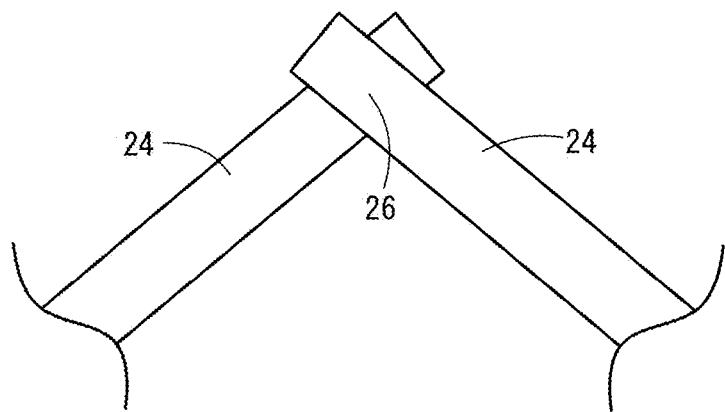
FIG. 9A is a front view of conductive wires prior to welding.

First, as shown in FIGS. 7 and 9A, in an arranging step, two conductive wires 24 are made to intersect, together with the ends of the respective conductive wires 24 being disposed at positions extended from the intersection site 26. At this time, the ends of the conductive wires 24 are at positions where they do not overlap with each other in close proximity to the intersection site 26. Further, a plurality (four in the present embodiment) of such intersection sites 26 may be closely arranged in a row.

Figure 8A:
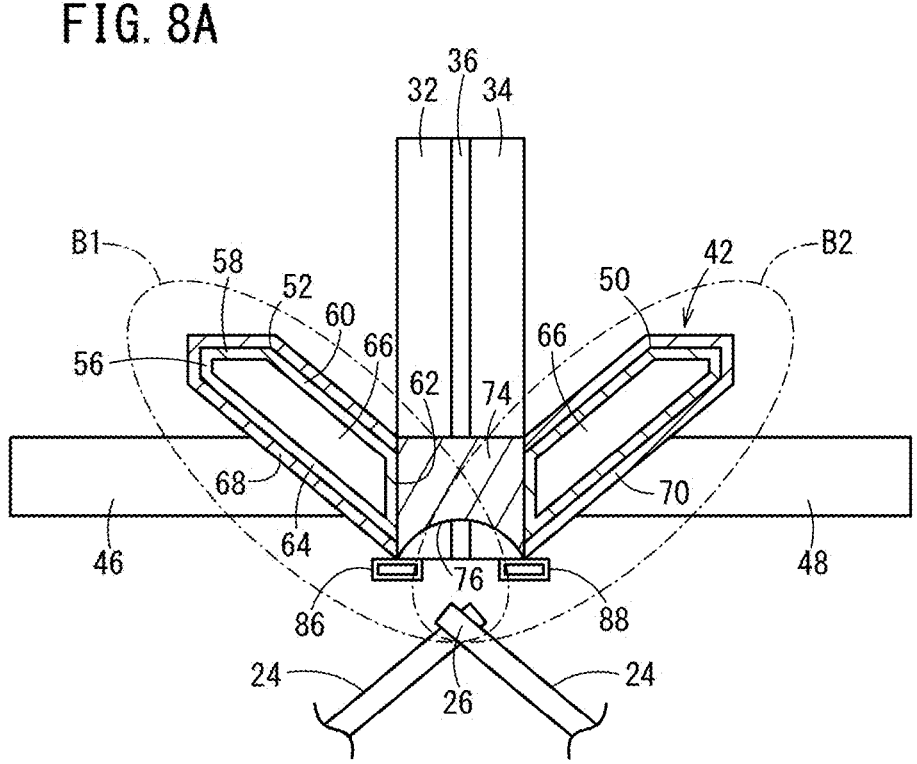
FIG. 8A is a partial cross-sectional view for describing lines of magnetic force.

Next, the one or more intersection sites 26 are set at a position downwardly (on the other side) of the core member 74 of the induction heating coil 42 (see FIG. 8A). At this time, the intersection sites 26 are arranged in the center between the pair of opposing members 50, 52. Further, the coolant is circulated in the coolant passage 66 of the induction heating coil 42, together with the gas being made to flow from the gas nozzles 86, 88.

In addition, in a welding step, a predetermined high-frequency current from the high-frequency power source flows in the induction heating coil 42. When this occurs, lines of magnetic force B1, B2 are generated around the periphery of the induction heating coil 42, as shown in FIG. 8A. With the induction heating coil 42 of the present embodiment, a mutual separation distance between the portions of the first inclined wall 60 that makes up the pair of opposing members 50, 52 becomes smaller from the one side toward the other side (from an upward location toward a lower location) in the height direction of the induction heating coil 42. Therefore, on an outer side of the induction heating coil 42, i.e., at a location downwardly of the core member 74, the lines of magnetic force B1, B2 of the pair of opposing members 50, 52 intersect. Further, the lines of magnetic force B1, B2 pass through the magnetic bodies 68, 70 and the core member 74, whereby the magnetic forces are concentrated downwardly of the core member 74, as compared to the case of passing through the air.

Figure 8B:
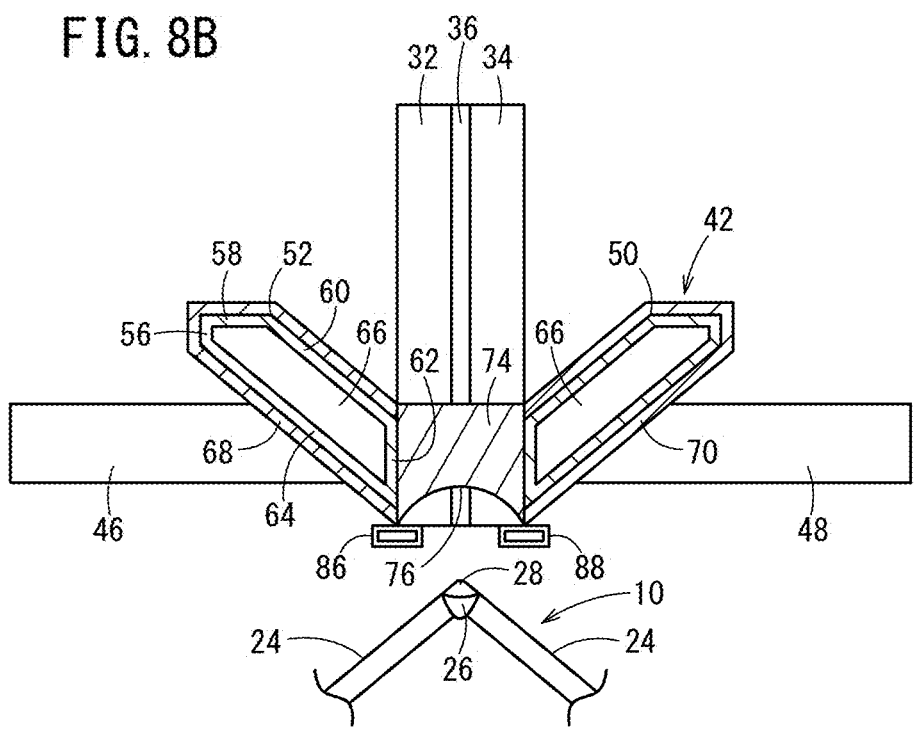
FIG. 8B is a partial cross-sectional view for describing a welding step.
Figure 9B:
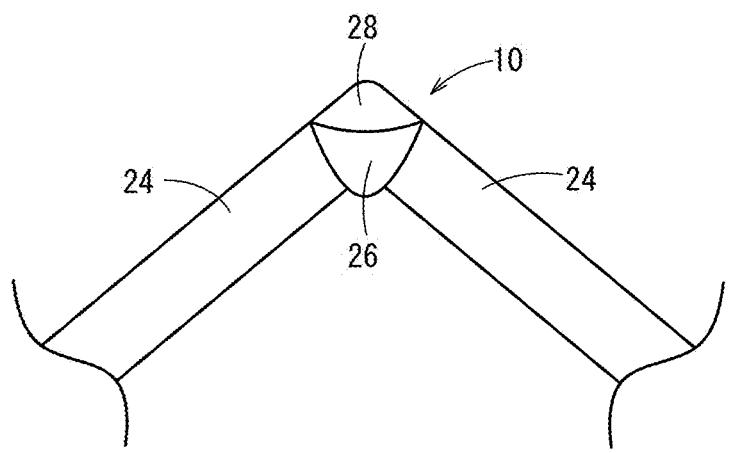
FIG. 9B is a front view of the conductive wire welded structure.

When this takes place, eddy currents flow in the ends of the conductive wires 24 that are extended from the respective intersection sites 26, and Joule heat is generated therein. More specifically, the ends that are extended from the respective intersection sites 26 are subjected to induction heating simultaneously. In addition, the ends are melted by such induction heating, and the molten material thereof becomes solidified at the intersection sites 26, whereby the welded part 28 is formed, and the conductive wire welded structures 10 for the aforementioned stator coils 22 are obtained (see FIGS. 8B and 9B).

In the welding step, because a magnetic field is generated by eddy currents in the molten material as well, in the molten material, a magnetic levitation force acts so as to lift up the molten material toward the side of the induction heating coil 42. Due to such magnetic levitation, the molten material does not drip down from the intersection site 26, and becomes solidified while being held at the intersection site 26. The position where the magnetic levitation force acts, i.e., an upper portion of the welded part 28, is not formed in the shape of a spherical surface under the action of surface tension, but rather in the form of a projection with a shape similar to that of a cone. Stated otherwise, the upper side portion of the welded part 28 is formed in a shape that projects at an acute angle tapering (upwardly) toward the side where the melted ends are located.

Figure 10:
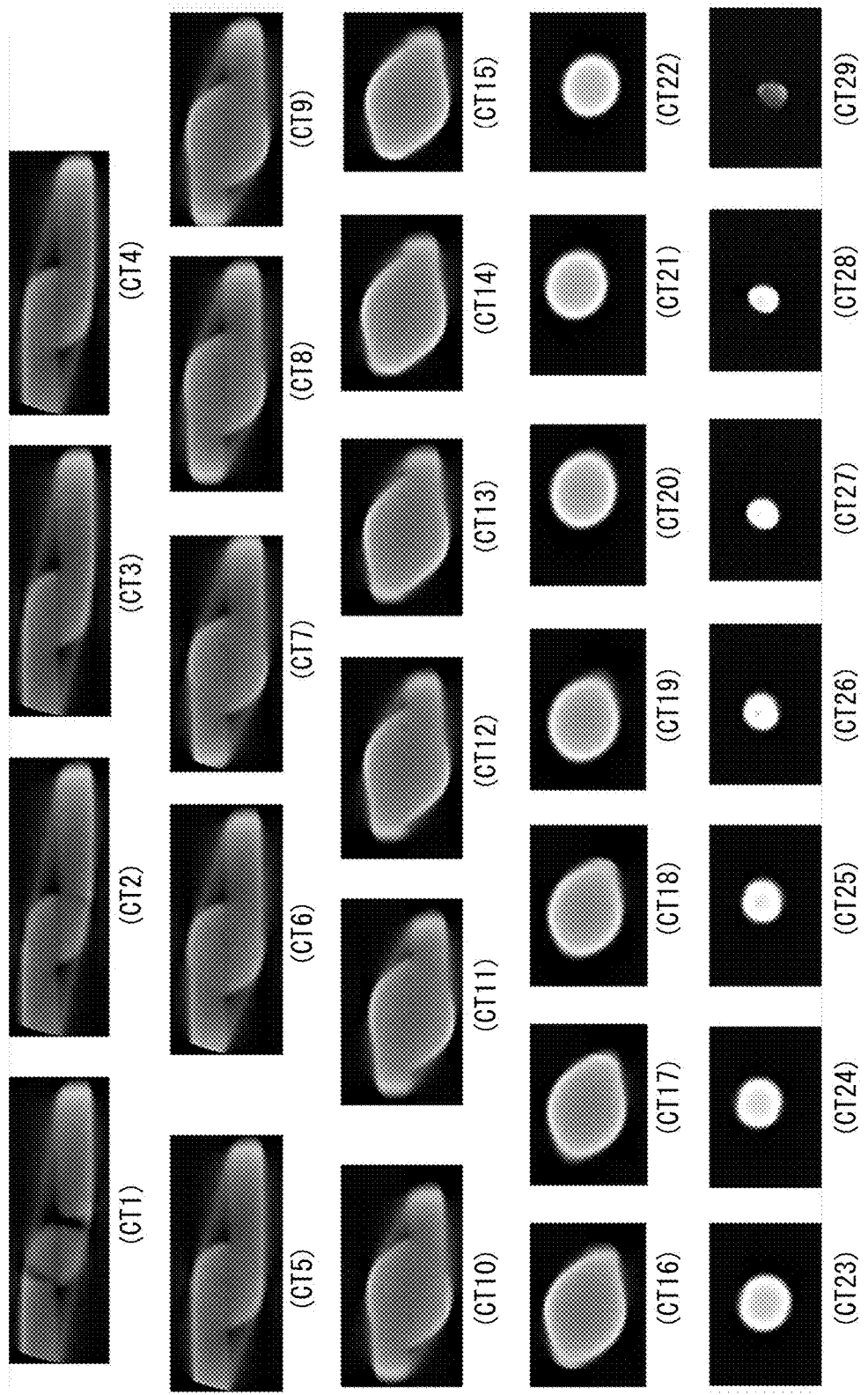
FIG. 10 shows CT scan images of the conductive wire welded structure shown in FIG. 9B.

FIG. 10 shows CT (Computed Tomography) scanned images taken at 0.2 mm increments from a lower portion of the intersection site 26 to the distal end (upper end part) of the welded part 28 of the conductive wire welded structure 10 which is constituted in the foregoing manner. In FIG. 10, the image numbers of the CT scan images become larger as they approach the distal end of the welded part 28. In accordance with the scan images, it can be understood that the two conductive wires 24 are welded together favorably, without any welding defects or the like being observed in the welded part 28 of the conductive wire welded structure 10 according to the present embodiment.

In accordance with the high-frequency induction heating device 30 of the present embodiment, by flowing of the high-frequency current through the pair of opposing members 50, 52, lines of magnetic force B1, B2 can be generated on the other side (vertical downward side) in the height direction of the induction heating coil 42. In addition, using the high-frequency induction heating device 30, the welded part 28 may be formed by causing to melt by way of induction heating the ends of the conductive wires 24 that reside at positions extended from the intersection site 26 at the outer side of the induction heating coil 42, and by solidification of the molten material at the intersection site 26. Consequently, even in the case that a sufficient space cannot be provided for TIG welding the intersection site 26, the plurality of conductive wires 24 can be welded together reliably and efficiently.

Figure 11A:
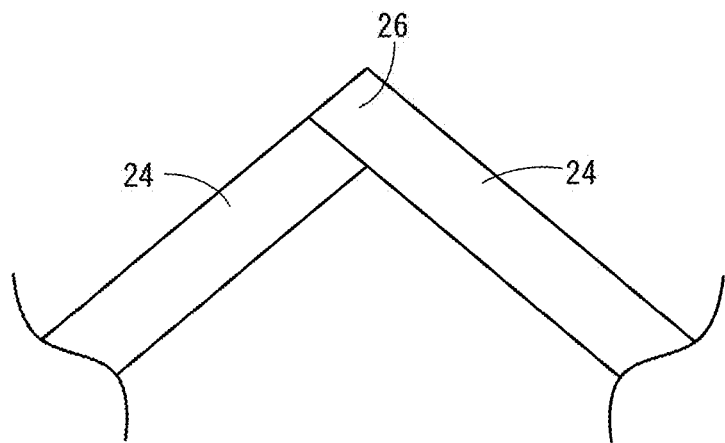
FIG. 11A is a front view of conductive wires prior to welding according to a comparative example.
Figure 11B:
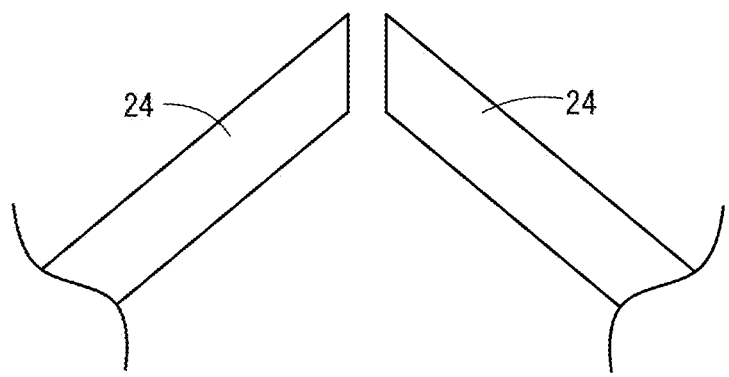
FIG. 11B is a front view showing a condition of the conductive wires of FIG. 11A, which have been subjected to high-frequency induction heating.

As shown in FIGS. 11A and 11B, in the case that the ends of two of the conductive wires 24 intersect each other and the intersection site 26 thereof is melted by induction heating, there is a concern that the molten material may drip and fall vertically downward, leading to a welding defect. However, according to the present embodiment, since the ends of the conductive wires 24 are disposed at positions extended from the intersection site 26, and the molten material thereof becomes solidified at the intersection site 26, a sufficient joint strength can be obtained.

According to the present embodiment, since the ends of the respective conductive wires 24 are disposed in the vicinity of the intersection site 26, the molten material can easily be guided to the intersection site 26. Further, because the magnetic levitation force is made to act in a (vertical upward) direction toward the side where the induction heating coil 42 is positioned, dripping down of the molten material from the intersection site 26 can further be suppressed. Stated otherwise, the molten material can be solidified while being held in position at the intersection site 26. Consequently, the plural conductive wires 24 can be welded together reliably.

Furthermore, since plural intersection sites 26 are arranged in series, and the ends of the conductive wires 24, which are disposed at positions extended from the respective intersection sites 26, are melted simultaneously and the molten material thereof becomes solidified at the intersection sites 26, compared to the case of welding the intersection sites 26 separately, the welding operation can be performed more efficiently.

According to the present embodiment, because the core member 74, which is constituted to include a magnetic material, is arranged between the pair of opposing members 50, 52, via the core member 74, the lines of magnetic force B1, B2 of the respective opposing members 50, 52 can be concentrated at the other side of the induction heating coil 42. Consequently, it is possible to efficiently carry out heating of the ends (heated portion) of the conductive wires 24.

Further, because the magnetic bodies 68, 70 are disposed on the outer surfaces of each of the opposing members 50, 52, via the magnetic bodies 68, 70, the lines of magnetic force B1, B2 of the respective opposing members 50, 52 can be concentrated at the other side of the induction heating coil 42. Consequently, it is possible to more efficiently carry out heating of the ends (heated portion) of the conductive wires 24.

Furthermore, since the induction heating coil 42 is formed substantially in a U-shape as viewed in plan, with a simple configuration, the ends (a plurality of heated portions) of the conductive wires 24 that extend respectively from the intersection site 26 can be subjected to induction heating simultaneously.

Figure 12:
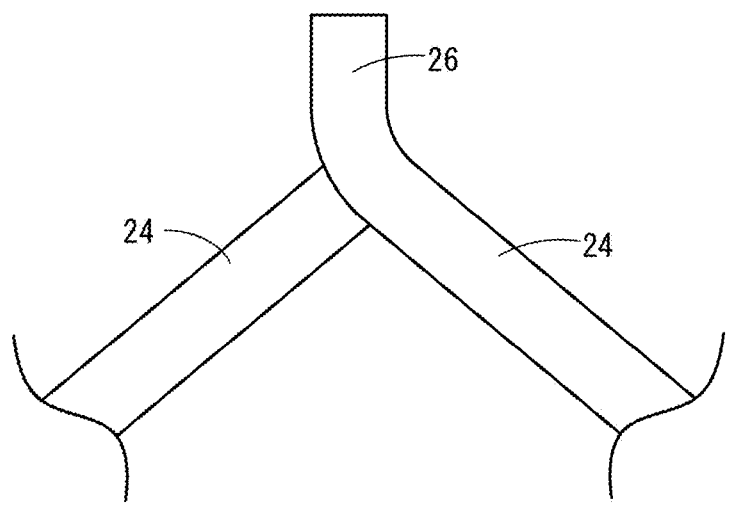
FIG. 12 is a front view of conductive wires prior to welding according to a modification.

The present embodiments are not limited to the structures or the method described above. In the arranging step, various changes thereto can arbitrarily be made, insofar as a plurality of conductive wires 24 are made to intersect, and an end of at least one of the conductive wires 24 is disposed at a position extended from the intersection site 26. For example, an arrangement is also possible in a condition in which two conductive wires 24 are made to intersect, together with ends of the conductive wires 24 being mutually overlapped at positions extending upwardly from the intersection site 26 (see FIG. 12). Further, three or more of the conductive wires 24 may be used.

Furthermore, in the case that the welded conductive wires 24 themselves are constituted from the same material (e.g., copper, etc.), it is preferable for them to include the same melting point so that welding can easily be performed. However, the conductive wires 24 need not necessarily be constituted from the same material, and conductive wires 24 may be welded having different melting points to a certain degree.

In the high-frequency induction heating device 30, at least one of the core member 74 and the magnetic bodies 68, 70 may be omitted. Further, the high-frequency induction heating device 30 is not limited to being applied to the aforementioned conductive wire welding method, and may be used for welding or heating of workpieces of various shapes.

The conductive wire welding method, the stator, and the high-frequency induction heating device according to the present invention are not limited to the embodiments described above, and it goes without saying that various additional or alternative configurations may be adopted therein without deviating from the essential gist of the present invention.

The invention claimed is:

1. A conductive wire welding method for welding a plurality of conductive wires, comprising:
    an arranging step of causing the plurality of conductive wires to intersect, together with disposing an end of at least one of the conductive wires at a position extended from an intersection site such that the end of at least one of the conductive wires constitutes a projecting portion projecting from the intersection site; and
    a welding step of melting by induction heating the end of the at least one conductive wire that is at the position extended from the intersection site on an outer side of an induction heating coil, guiding the melted conductive wire as a molten material to the intersection site and causing the melted conductive wire to become solidified at the intersection site such that the projecting portion is melted and retreated to the intersection site.

2. The conductive wire welding method according to claim 1, wherein, in the arranging step, the end of the at least one conductive wire is positioned in close proximity to the intersection site.

3. The conductive wire welding method according to claim 1, wherein:
    in the arranging step, the intersection site is disposed vertically below the induction heating coil; and
    in the welding step, the molten material is solidified at the intersection site while being subjected to action of a magnetic levitation force on the molten material that is oriented vertically upward.

4. The conductive wire welding method according to claim 1, wherein:
    in the arranging step, a plurality of the intersection sites are arranged side by side; and in the welding step, while an end of at least one of the conductive wires is at a position extended from each of the intersection sites, the ends are melted simultaneously by induction heating, and the molten material is solidified at the intersection sites.

5. A stator including a conductive wire welded structure in which plural stator coils are welded on an outer side in an axial direction of a stator core;
wherein the conductive wire welded structure includes an intersection site where a plurality of conductive wires intersect, and is formed by melting by way of induction heating an end of at least one of the conductive wires that is at a position extended from the intersection site such that the end of at least one of the conductive wires constitutes a projecting portion projecting from the intersection site, guiding the melted conductive wire as a molten material to the intersection site and by solidification of the melted conductive wire at the intersection site such that the projecting portion is melted and retreated to the intersection site.

6. The stator according to claim 5, wherein the conductive wire welded structure is formed by melting by way of induction heating the end of the at least one conductive wire that is at the position extended from the intersection site on an outer side of an induction heating coil, and by solidification of the molten material at the intersection site.

* * * * *